US00RE37201E

(19) United States
(12) Reissued Patent
Lai

(10) Patent Number: US RE37,201 E
(45) Date of Reissued Patent: Jun. 5, 2001

(54) JEWELRY SETTING

(75) Inventor: Danny S. Lai, New York, NY (US)

(73) Assignee: Gramercy Jewelry Manufacturing Corp., New York, NY (US)

(21) Appl. No.: 29/112,527

(22) Filed: Oct. 18, 1999

Related U.S. Patent Documents

Reissue of:
(64) Patent No.: Des. 403,611
Issued: Jan. 5, 1999
Appl. No.: 29/072,601
Filed: Jun. 20, 1997

(51) LOC (7) Cl. ..... 11- 01
(52) U.S. Cl. ..... D11/91
(58) Field of Search ..... D11/1, 2, 36, 48, D11/75–76, 86–98, 91, 92; 63/1.1, 2, 13, 26, 27, 29 R, 15–15.8; 128/329

(56) References Cited

U.S. PATENT DOCUMENTS

D. 275,660 * 9/1984 Carroll ..... D11/86
D. 337,741 * 7/1993 Garfolo ..... D11/86
554,870 * 2/1896 Heppding ..... 63/27
3,014,354 * 12/1961 McCary ..... 63/27

* cited by examiner

*Primary Examiner*—Ralf Seifert
(74) *Attorney, Agent, or Firm*—Baker Botts, L.L.P.

(57) CLAIM

The ornamental design for a jewelry setting, as shown and described.

DESCRIPTION

FIG. 1 is a top plan view of a jewelry setting showing my [new] design;
FIG. 2 is a bottom plan view of the jewelry setting of FIG. 1; and,
FIG. 3 is a right side elevational view of the jewelry setting of FIG. 1, the left side being a mirror image thereof.

1 Claim, 1 Drawing Sheet

Matter enclosed in heavy brackets [ ] appears in the original patent, but forms no part of this reissue; matter printed in italics indicates the additions made by reissue.

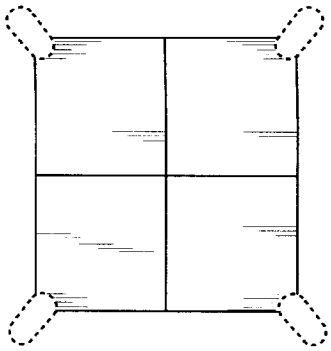
FIG. 1
(AMENDED)
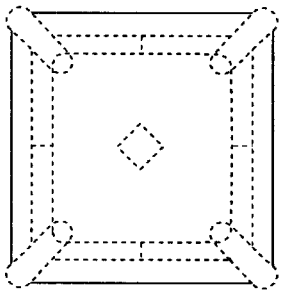
FIG. 2
(AMENDED)
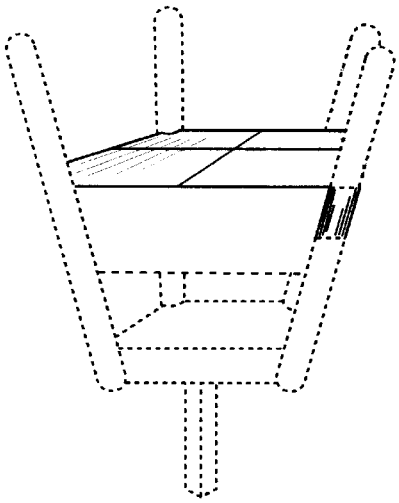
FIG. 3
(AMENDED)

UNITED STATES PATENT AND TRADEMARK OFFICE

CERTIFICATE OF CORRECTION

PATENT NO. : RE 37,201 E
DATED : June 5, 2001
INVENTOR(S) : Lai

It is certified that error appears in the above-identified patent and that said Letters Patent is hereby corrected as shown below:

Title page,
Item [56], References Cited, U.S PATENT DOCUMENTS, "D. 275, 660 *9/1984 Carroll", should be deleted.

Signed and Sealed this

Thirtieth Day of April, 2002

*Attest:*

*Attesting Officer*

JAMES E. ROGAN
*Director of the United States Patent and Trademark Office*